United States Patent
Johnsgard et al.

(10) Patent No.: US 9,444,816 B2
(45) Date of Patent: Sep. 13, 2016

(54) CONTINUOUS VOICE AUTHENTICATION FOR A MOBILE DEVICE

(75) Inventors: Todd J. Johnsgard, San Diego, CA (US); Ta-yan Siu, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 941 days.

(21) Appl. No.: 13/076,241

(22) Filed: Mar. 30, 2011

(65) Prior Publication Data

US 2012/0252411 A1 Oct. 4, 2012

(51) Int. Cl.
*G10L 17/00* (2013.01)
*G10L 15/00* (2013.01)
(Continued)

(52) U.S. Cl.
CPC ....... *H04L 63/0861* (2013.01); *G07C 9/00158* (2013.01); *H04M 1/67* (2013.01);
(Continued)

(58) Field of Classification Search
CPC . G10L 15/22; G10L 15/265; G10L 2015/22; G10L 2015/225; G10L 2015/227; G10L 2015/228; G10L 17/00; G10L 17/005; G10L 17/22; G10L 17/24; G10L 17/26; G06F 1/00; G06F 3/00; G06F 3/167; G06F 3/16; G06F 17/00; G06F 17/30; G06F 17/30026; G06F 17/3074; H04M 1/66; H04M 1/663; H04M 1/665; H04M 1/667; H04M 1/67; H04M 1/673; H04M 1/677; H04M 1/6775; H04M 7/006; H04M 7/0078; H04M 2203/60; G06Q 20/206; G06Q 20/322
USPC ................ 704/231, 246–250, 251, 252, 273; 379/88.01, 88.02; 455/410, 411
See application file for complete search history.

(56) References Cited

U.S. PATENT DOCUMENTS 5,229,764 A 7/1993 Matchett et al.
6,542,729 B1 * 4/2003 Chmaytelli et al. .......... 455/410
(Continued)

FOREIGN PATENT DOCUMENTS

CN 1403953 A 3/2003
EP 1128700 A2 8/2001
(Continued)

OTHER PUBLICATIONS

Auckenthaler R., et al.,"Speaker-centric score normalisation and time pattern analysis for continous speaker verification", Acoustics, Speech, and Signal Processing, 2000. ICASSP 00. Proceeding S. 2000 IEEE International Conference on Jun. 5-9, 2000, Piscataway, NJ, USA,IEEE, vol. 2, Jun. 5, 2000, pp. 1065-1068, XP010504910, ISBN: 978-0-7803-6293-2 Abstract Section 1.
(Continued)

*Primary Examiner* — Paras D Shah
(74) *Attorney, Agent, or Firm* — Won Tae C. Kim

(57) ABSTRACT

Disclosed is an apparatus, system, and method to continuously authenticate a user of a mobile device. The mobile device includes a user interface, a transceiver, a microphone, and processor. The processor continuously samples a user's voice from the microphone during a call by obtaining voice snippets on a pre-defined periodic basis or on a random basis. The processor further compares the sampled voice from the microphone to a stored voice to authenticate a valid user, wherein if the sampled voice matches the stored voice for a valid user, functionality of the mobile device continues. On the other hand, if the sampled voice does not match the stored voice for a valid user, functionality of the mobile device is locked.

15 Claims, 6 Drawing Sheets

(51) Int. Cl.
*H04L 29/06* (2006.01)
*G07C 9/00* (2006.01)
*H04M 1/67* (2006.01)
*H04W 12/12* (2009.01)
*H04W 88/02* (2009.01)

(52) U.S. Cl.
CPC ............ *H04W 12/12* (2013.01); *G10L 17/00* (2013.01); *H04M 2201/41* (2013.01); *H04M 2203/6045* (2013.01); *H04M 2203/6054* (2013.01); *H04W 88/02* (2013.01)

(56) References Cited

U.S. PATENT DOCUMENTS

| | | | |
|---|---|---|---|
| 7,212,613 B2* | 5/2007 | Kim et al. | 379/88.02 |
| 7,324,946 B2* | 1/2008 | Novack et al. | 704/273 |
| 7,753,281 B2* | 7/2010 | Li et al. | 235/492 |
| 2002/0095586 A1 | 7/2002 | Doyle et al. | |
| 2002/0152070 A1* | 10/2002 | Oda | 704/246 |
| 2002/0194003 A1* | 12/2002 | Mozer | 704/270.1 |
| 2005/0063522 A1 | 3/2005 | Kim et al. | |
| 2005/0073389 A1* | 4/2005 | Chandley | G06F 21/554 340/5.31 |
| 2005/0170811 A1* | 8/2005 | Pelaez et al. | 455/410 |
| 2005/0190900 A1* | 9/2005 | White et al. | 379/102.06 |
| 2005/0273626 A1* | 12/2005 | Pearson et al. | 713/186 |
| 2006/0025110 A1* | 2/2006 | Liu | 455/411 |
| 2006/0079204 A1* | 4/2006 | Pon | G06F 21/88 455/411 |
| 2006/0259304 A1* | 11/2006 | Barzilay | 704/273 |
| 2008/0134347 A1* | 6/2008 | Goyal | G06F 21/6209 726/29 |
| 2008/0180244 A1* | 7/2008 | Howarth | G06F 21/88 340/568.1 |
| 2009/0143048 A1* | 6/2009 | Ayanamcottil et al. | 455/410 |
| 2009/0253408 A1* | 10/2009 | Fitzgerald et al. | 455/411 |
| 2010/0091953 A1* | 4/2010 | Kim et al. | 379/88.02 |
| 2010/0167753 A1* | 7/2010 | Das et al. | 455/456.1 |
| 2010/0207721 A1* | 8/2010 | Nakajima et al. | 340/5.3 |
| 2010/0216429 A1* | 8/2010 | Mahajan | 455/411 |
| 2011/0076981 A1* | 3/2011 | Singh et al. | 455/404.1 |
| 2011/0080260 A1* | 4/2011 | Wang et al. | 340/5.83 |
| 2011/0275348 A1* | 11/2011 | Clark et al. | 455/411 |
| 2012/0245941 A1* | 9/2012 | Cheyer | 704/246 |

FOREIGN PATENT DOCUMENTS

| | | |
|---|---|---|
| EP | 1447794 A1 | 8/2004 |
| EP | 1873999 A1 | 1/2008 |
| JP | 2001245342 A | 9/2001 |
| JP | 2005122700 A | 5/2005 |
| JP | 2006259925 A | 9/2006 |
| JP | 2007235823 A | 9/2007 |
| JP | 2008066832 A | 3/2008 |
| JP | 2008113345 A | 5/2008 |
| JP | 2009049878 A | 3/2009 |
| JP | 2010086328 A | 4/2010 |
| KR | 20080060870 A | 7/2008 |
| WO | 0028721 A1 | 5/2000 |
| WO | 2004038639 A2 | 5/2004 |

OTHER PUBLICATIONS

Cope B.J.B., "Biometric Systems of Access Control", Electrotechnology, Incorporated Engineers, vol. 18, No. 1, Apr. 1, 1990, pp. 71-74, XP000764630, ISSN: 0306-8552 abstract p. 3.
International Search Report and Written Opinion—PCT/US2012/031551—ISA/EPO—Sep. 25, 2012.

* cited by examiner

CONTINUOUS VOICE AUTHENTICATION FOR A MOBILE DEVICE

BACKGROUND

1. Field

The present invention relates generally to continuous voice authentication for a mobile device.

2. Relevant Background

Today, the use of mobile electronic devices is widespread. Such mobile devices can provide a user with wireless phone access, Internet access, allow the user to perform on-line transactions such as on-line shopping, on-line banking, as well as other applications such as finding maps to particular locations, etc. Thus, today's mobile devices allow for wireless communication as well as almost all of the Internet features associated with non-mobile computer systems. Examples of such mobile electronic devices include: mobile devices, smart phones, cellular phones, personal digital assistants (PDAs), digital cameras, mobile computers, etc.

Thus, today, the use of mobile electronic devices is widespread. Mobile devices can increase a user's productivity and quality of life, but, unfortunately, they are susceptible to loss, theft, or unauthorized use. Mobile devices often carry private, confidential, and/or difficult-to-replace data, and the loss of such data further compounds the loss of the mobile device. Although a mobile device that has been lost or stolen can be physically replaced, oftentimes the data stored on such a device is confidential and/or irreplaceable.

Additionally, the authorized user of a lost or stolen mobile device may have to deal with ramifications such as the misuse of information or someone else gaining access to information stored on the mobile device. Further, it is not uncommon for hours or even days to lapse before the authorized user of the mobile device discovers the loss, and during that time, an unauthorized user may be accessing sensitive data, misappropriating information, making national and international phone calls, or riding up charges for goods or service on the authorized user's accounts through on-line purchases and transactions.

Various techniques to prevent unauthorized use of mobile devices such as locking features that utilize codes or PIN numbers to unlock mobile devices have been used. Unfortunately, these authorization schemes are often not utilized by users therefore they are ineffective. Moreover, these types of authorization schemes can be easily overcome by thieves—since they are short and often predictable, so as to be memorable to users.

As previously described, mobile devices, and in particular, cellular phones, are increasingly used not only for phone communication but for other purposes as well by an ever increasing amount of the population. Moreover, especially, in developing countries, mobile devices are the only types of phones being utilized. With the potential threat of theft and unauthorized use of mobile devices, improved techniques to prevent the fraudulent use of mobile devices are continuously sought after.

SUMMARY

Embodiments of the invention may relate an apparatus, system, and method to continuously authenticate a user of a mobile device. The mobile device includes a user interface, a transceiver, a microphone, and processor. The processor continuously samples a user's voice from the microphone during a call by obtaining voice snippets on a pre-defined periodic basis or on a random basis. The processor further compares the sampled voice from the microphone to a stored voice to authenticate a valid user, wherein, if the sampled voice matches the stored voice for a valid user, functionality of the mobile device continues. On the other hand, if the sampled voice does not match the stored voice for a valid user, functionality of the mobile device is locked.

DETAILED DESCRIPTION

The word "exemplary" is used herein to mean "serving as an example, instance, or illustration." Any embodiment described herein as "exemplary" or "example" is not necessarily to be construed as preferred or advantageous over other embodiments.

Figure 1:
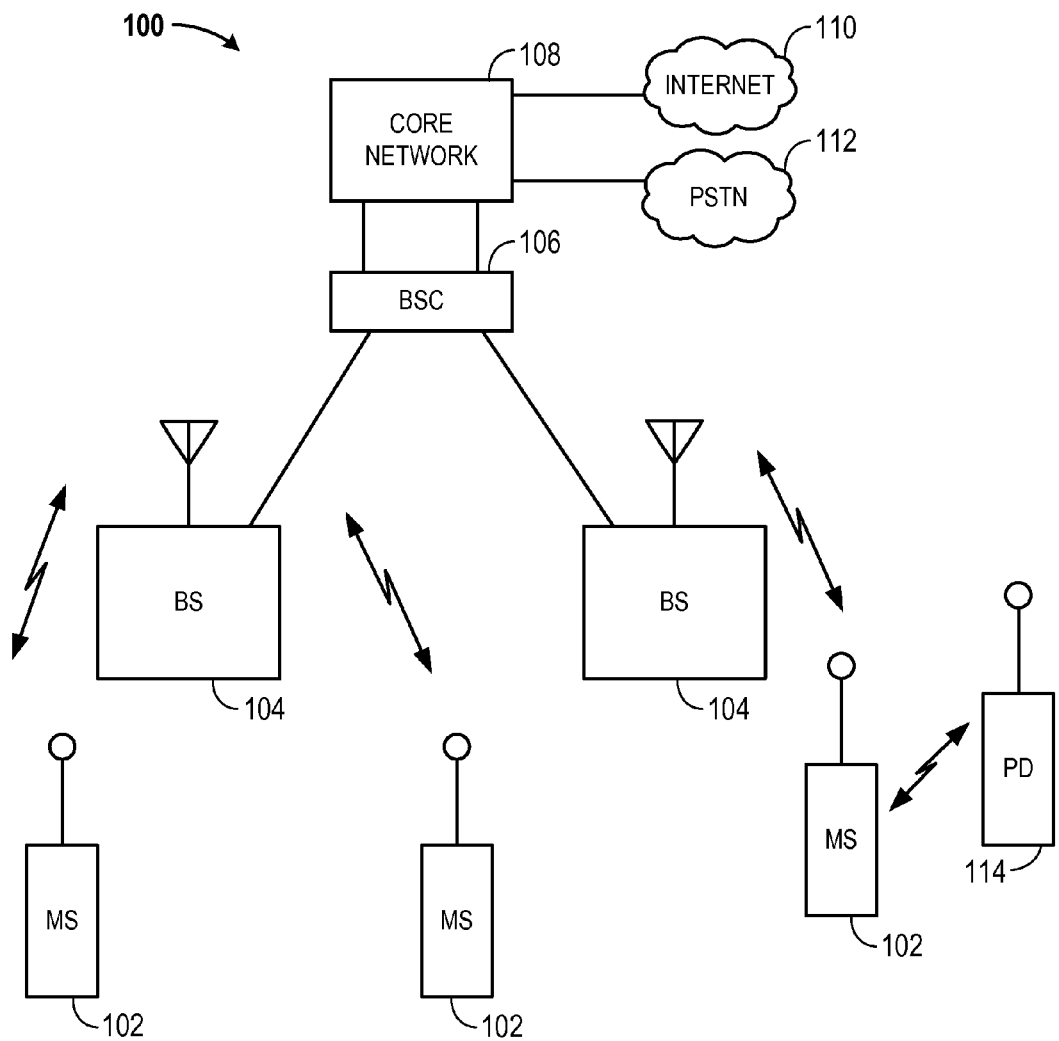
FIG. 1 is a block diagram of an example of a wireless communication system.

With reference to FIG. 1, a wireless mobile station (MS) 102 may communicate with one or more base stations (BS) 104 of a wireless communication system 100. The MS may further pair with a wireless peer device 114. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

A wireless device, 102 or 114, may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

Embodiments of the invention relate to an apparatus, method, and system that implements continuous voice sampling of a mobile device (e.g., a cell phone) to identify potential theft or misuse. Besides voice sampling, other biometrics may also be used. However, it has been found that voice sampling is the cheapest, most cost effective, and most efficient implementation—as there is no new additional hardware requirements related to performing the functionality of speech verification—as in an ordinary mobile device (e.g., cell phone) because the microphones and related hardware supplies already exist. In particular, continuous voice sampling may be done covertly, such that it is not known by the user. The voice biometric is also the most natural and unobtrusive for users. Voice biometrics also can operate using any spoken word or phrase—the user need not repeat a specific word or phrase used during enrollment. A user may thereby be determined to be a valid/authenticated user or a non-valid user.

Figure 2:
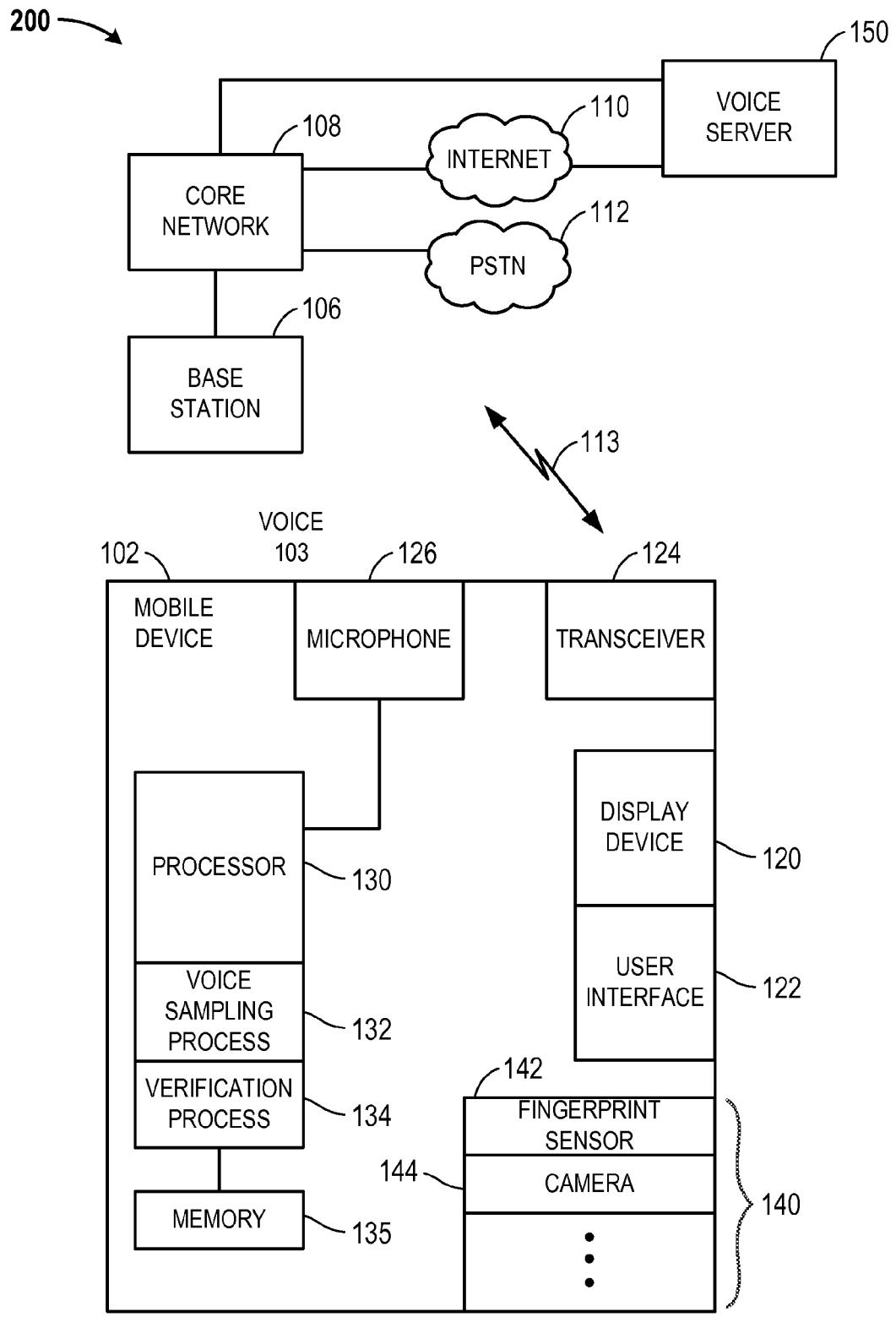
FIG. 2 is a block diagram of a system in which embodiments of the invention may be practiced.

With reference to FIG. 2, FIG. 2 is a block diagram of a system 200 in which embodiments of the invention may be practiced. In particular, system 200 illustrates a mobile device 102 that continuously authenticates a user. Mobile device 102 may include a display device 120, a user interface 122, a transceiver 124, a microphone 126, and a processor 130. It should be appreciated that the display device 122 may be a typical display device on a mobile device 102 such as a cell phone, personal digital assistant, mobile computer, etc. User interface 122 may be a keypad, keyboard, or another type of user interface input device, typically used with a mobile device. Additionally, a microphone 126, a power device (not shown), as well as other well known components of mobile devices may be present, but are not shown, for brevity's sake, as they are well known.

In particular, mobile device 102 may include a processor 130 and a memory 135 configured to execute instructions for implementing a voice sampling process 132 and a verification process 134. Memory 135 may be coupled to processor 130 to store instructions for implementation by the processor 130. Thus, mobile device 102 is configured to execute instructions to implement a voice sampling process 132 and a verification process 134.

Voice sampling process 132 may be used to continuously sample a user's voice from the microphone 126 during a call by obtaining voice snippets on a pre-defined periodic basis or on a random basis. Further, verification process 134 may be used to compare the sampled voice 103 from the microphone 126 to a stored voice in memory 135 to authenticate a valid user. If the sampled voice 103 matches the stored voice for a valid user, functionality of the mobile device 102 continues. On the other hand, if the sample voice 103 does not match the stored voice for a valid user, functionality of the mobile device is locked by processor 130. This may include disabling the user interface 122 and the transceiver 124 and ending the call. Additionally, other functions of the mobile device such as the display device 120 and the microphone 126, as well as other components of the mobile device 102 may be disabled. In some embodiments, the power of the mobile device 102 may be completely disabled.

In one embodiment, before the mobile device is disabled, if the sampled voice does not match the stored voice for a valid user, the verification process 134 commands that an invalid user signal be transmitted via wireless link 133 via the transceiver 124 to a carrier to report the mobile device 122 as stolen. The invalid user signal may first be transmitted to the voice server 150 and then to the carrier or may be sent directly to the carrier.

Also, in one embodiment, the stored voice to authenticate a valid user may be based upon a user's voice recorded as part of an enrollment process during a purchase of the mobile device 102. As will be described, the voice recorded for the user as part of an enrollment process during the purchase of the mobile device, may occur at the store that the mobile device is purchased at and may also be stored for use by the voice server 150.

In another embodiment, the verification process may be implemented by a voice server 150 instead of or in conjunction with mobile device 102. The voice server 150 may be coupled to the core network 108 directly or via the Internet 110 or other types of private or public networks. In this embodiment, the sampled voice 103 from the mobile device 102 is transmitted via the transceiver 124 and wireless link 113 to the voice server 150 to implement the verification process to compare the sample voice to a stored voice to authenticate a valid user. If the sampled voice matches 103 the stored voice for a valid user, the voice server 150 transmits an authentication signal via the wireless link 113 back to the mobile device 102 and functionality of the mobile device 102 continues. On the other hand, if the sampled voice 103 does not match the stored voice for a valid user, the voice server 150 via wireless link 113 transmits an authentication failed signal back to the mobile device 102 wherein upon receipt of the authentication fail signal, the processor 130 of the mobile device 102 locks the functionality of the mobile device, as previously described. Further, the voice server 150 may transmit an invalid user signal to a carrier reporting that the functionality of the mobile device 102 has been locked and that the mobile device has been stolen.

In some embodiments, overt authentication, in addition to covert authentication may also be used. As examples of overt authentication devices 140, a fingerprint sensor 142 may be used to obtain a user's fingerprint for use in the verification process 134 in combination with the sampled voice. Also, a camera 144 may be used to obtain a picture of a user's face which can be used in the verification process 134 in combination with the sampled voice. However, it should be appreciated that these devices may also be used covertly.

Additionally, other covert information for the mobile device 102, such as, location, direction, speed, or recent data entered by the user to the user interface 122 may be used in the verification process 134 in combination with the sampled voice. Thus, in addition to the covert authentication utilized by the mobile device 102, a variety of overt types of authentication may also be utilized in combination with the sampled voice to verify that the user is a valid user.

Figure 3:
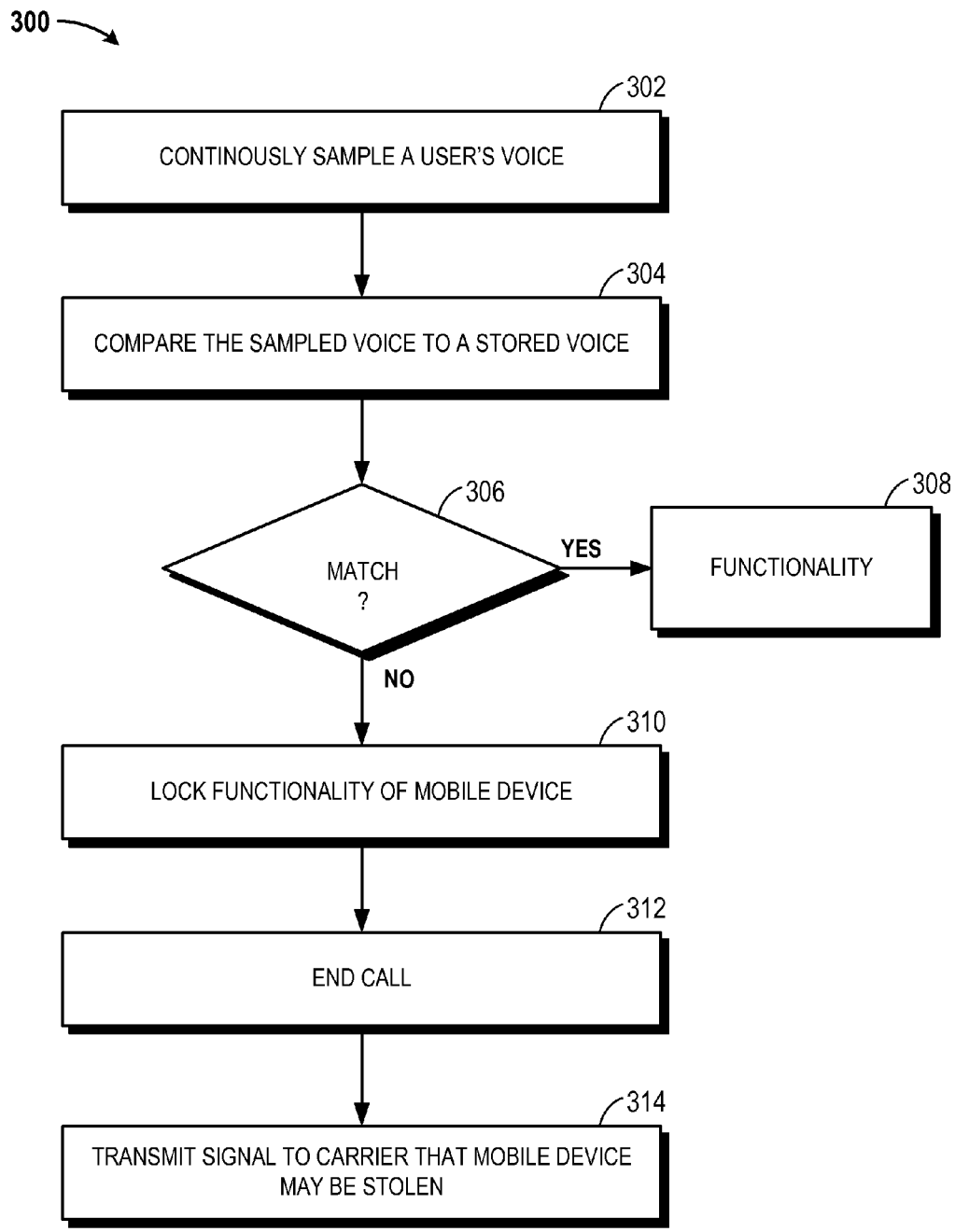
FIG. 3 is a flow diagram to illustrate a process to continuously authenticate a user of a mobile device.

With brief reference to FIG. 3, a flow diagram is shown to illustrate a process 300 to continuously authenticate a user of a mobile device. At block 302, a user's voice is continuously sampled from a microphone during a call by obtaining voice snippets on a pre-defined periodic basis or on a random basis. Next, at block 304, the sampled voice from the microphone is compared to a stored voice to authenticate a valid user. Next, at decision block 306, process 300 determines whether the sampled voice matches the stored voice for a valid user. If so, at block 308, functionality of the mobile device continues. If not, at block 310, functionality of the mobile device is locked and the call is ended (block 312). Further, an invalid user signal may be transmitted to a carrier reporting that the functionality of the device has been locked and that the mobile device has been stolen (block 314). In particular, the functionality of process 300, may be implemented primarily by either the mobile device 102 or the voice server 150, either alone or in combination with one another.

Figure 4A:
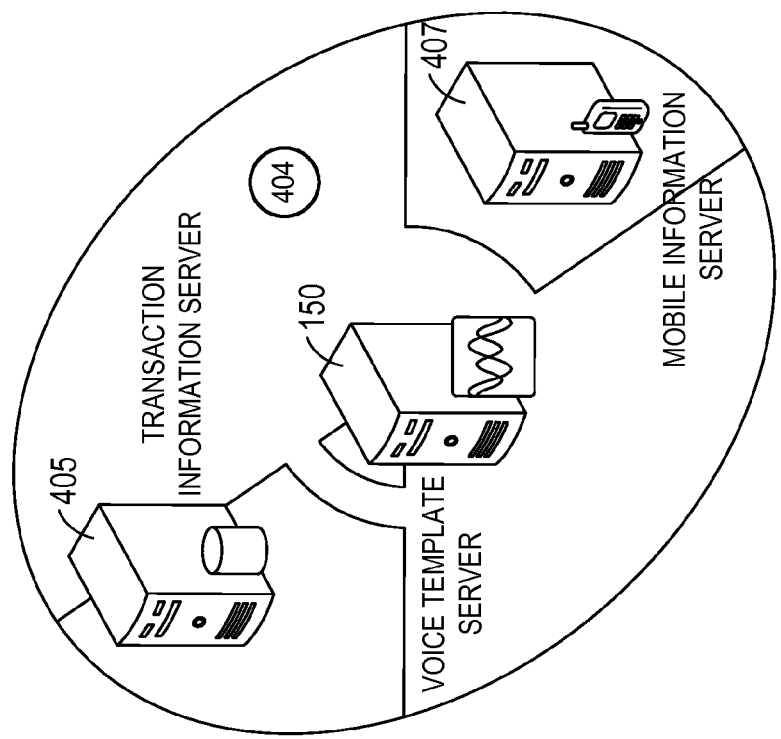
FIG. 4A is a diagram of an example of an authentication process for the mobile device with a voice server.
Figure 4A:
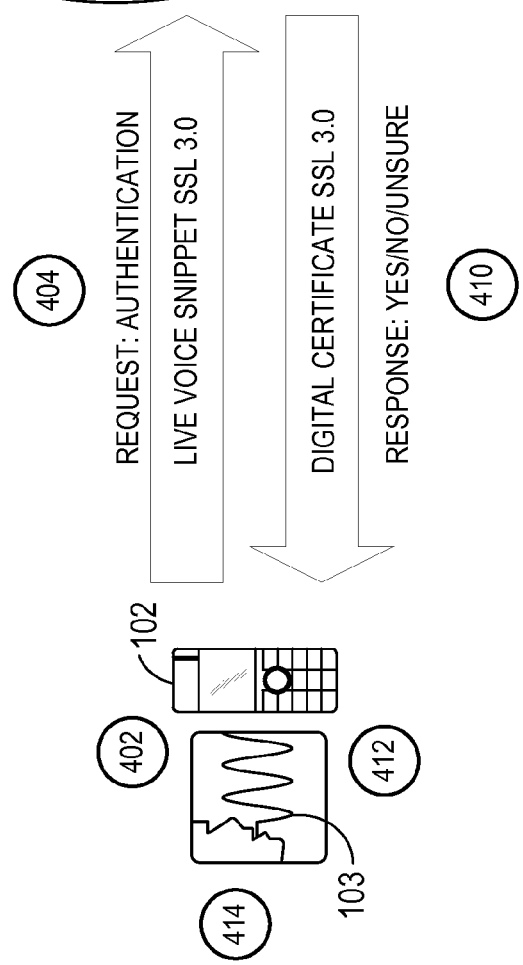

Turning to FIG. 4A, an example of the authentication process of the mobile device 102 is illustrated, according to one embodiment of the invention. As shown in FIG. 4A, a user 402 is speaking with user voice 103 to a mobile device 102. A secure request for authentication and a live voice snippet (e.g., secure socket layer (SSL 3.0)) 404 is transmitted via a wireless link to the voice template server 150. Thus, the request for authentication and the actual voice snippet 404 (e.g., may be selected based on a pre-defined periodic basis or randomly) are sent securely from the mobile device 102 to the voice server 150. The voice server 150 compares the voice snippets with a stored voice for a valid user associated with the mobile device 102.

A secure response 410 may then be transmitted via a wireless link back to the mobile device. For example, the secure response 410 may be a digital certificate SSL 3.0. Further, the secure response 410 may include the following responses: yes-valid user; no-invalid user; or unsure. In the case of an unsure response, additional voice snippets may be sent from the mobile device 102 back to the voice server 150 until a clear "yes" or "no" response is made. However, a timeout due to too many "unsure" responses may be implemented. Also, the user may be prompted for overt authentication if too many "unsure" responses are received by the mobile device 102.

Thus, in essence, an action is transmitted back to the mobile device 102 and that action may be: a) identify that the correct user has their mobile device and let the user continue to talk and use their mobile device; or b) block the mobile device because the stored and sampled voice snippets do not match—and report that the mobile device is stolen to a carrier.

It should be appreciated that the previously described processes may be implemented by the voice server 150. Further, as previously described, these types of operations may be implemented by the mobile device 102 itself, in which, the stored voice template is stored locally on the mobile device 102 and the voice receiving process and the verification process are implemented by the mobile device 102 itself. Further, these operations may likewise be implemented by both the mobile device 102 and a voice server 150 in an appropriate manner.

Figure 4B:
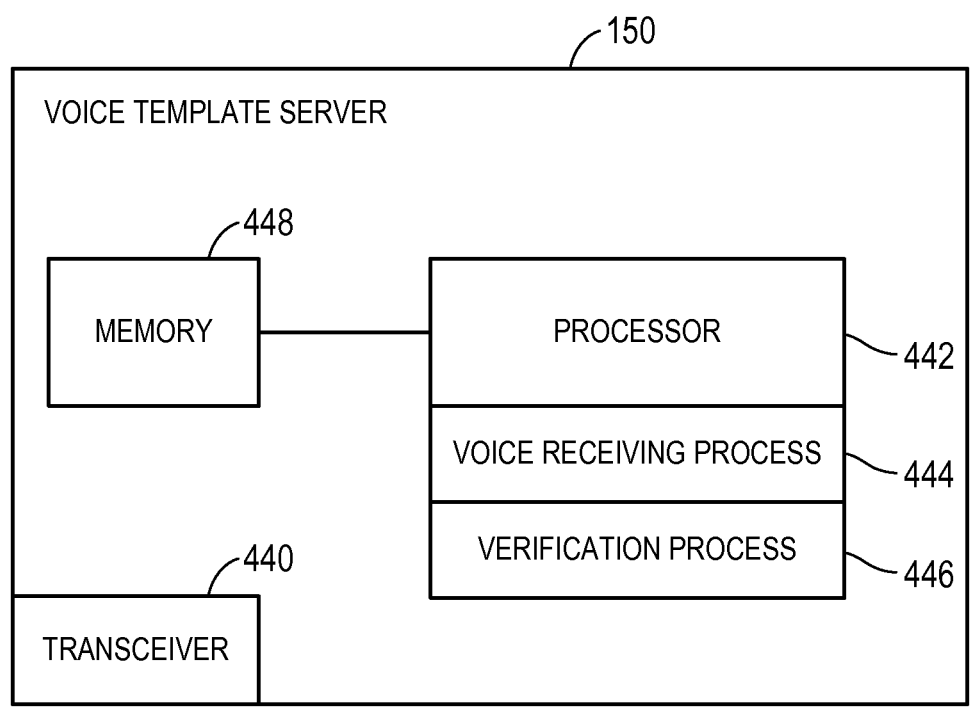
FIG. 4B is a diagram of a voice server that may be used to continuously authenticate a user of a mobile device.

With brief reference to FIG. 4B, voice server 150 may be used to continuously authenticate a user of a mobile device, according to one embodiment of the invention, as previously described. In essence, the voice server 150 implements many of the same functions as the mobile device 102 when the mobile device does the continuous authentication. In this embodiment, voice server 150 includes as transceiver 440 to receive and transmit data and a processor 442 to implement a voice receiving process 444 and a verification process 446. Further, memory 448 may be utilized to store instructions to implement these processes. It should be appreciated that this is just one example of a computer or server to implement these processes.

In one embodiment, processor 442 may implement a voice receiving process 444 to receive from the transceiver 440 a user's sampled voice transmitted from the mobile device 102 during a user's call including receiving voice snippets on a pre-defined periodic basis or on a random basis from the mobile device 102. The verification process 446 may be used to compare the sampled voice from the mobile device 102 to a stored voice in memory 448 for the user to authenticate a valid user. If the sampled voice matches the stored voice for a valid user, an authentication successful signal is transmitted back to the mobile device 102 and functionality of the mobile device is allowed to continue. On the other hand, if the sampled voice does not match the stored voice for a valid user, an authentication fail signal is transmitted back to the mobile device 102, wherein upon receipt of the authentication fail signal, the functionality of the mobile device 102 is locked and the call is ended.

Additionally, if the sampled voice does not match the stored voice for a valid user, the verification process 446 may further command that an invalid user signal be transmitted via the transceiver 440 to a carrier to report the mobile device 102 as stolen. The stored voice in memory 448 to authenticate a valid user may be based upon a user's voice recorded as part of an enrollment process during a purchase of the mobile device 102 at a mobile device store.

Further, referring back to FIG. 4A, voice server 150 may be further coupled to a transaction information server 405 and a mobile information server 407. The transaction information server 405 may contain a database of contracts, agreements, and forms for transactions to be executed or managed if access to these servers is offered. For example, the transaction information server through the voice server 150 may further provide access to a server based businesses. The mobile information server 407 may include such information data as electronic serial numbers (ESN); international mobile equipment identity (IMEI), phone number, subscriber identity module (SIM) card number, billing address, name on record for account, PIN, etc. Thus, the voice template server 150 in cooperation with the transaction information server 405 and the mobile information server 407 may be part of the core network, directly attached to the core network, or connected to the core network via the Internet or other networks in order to assist the core network in authenticating valid users and identifying and disabling mobile devices that may be stolen, as well as, processing transactions with computer-based businesses. This may be of great service to operators.

Figure 5:
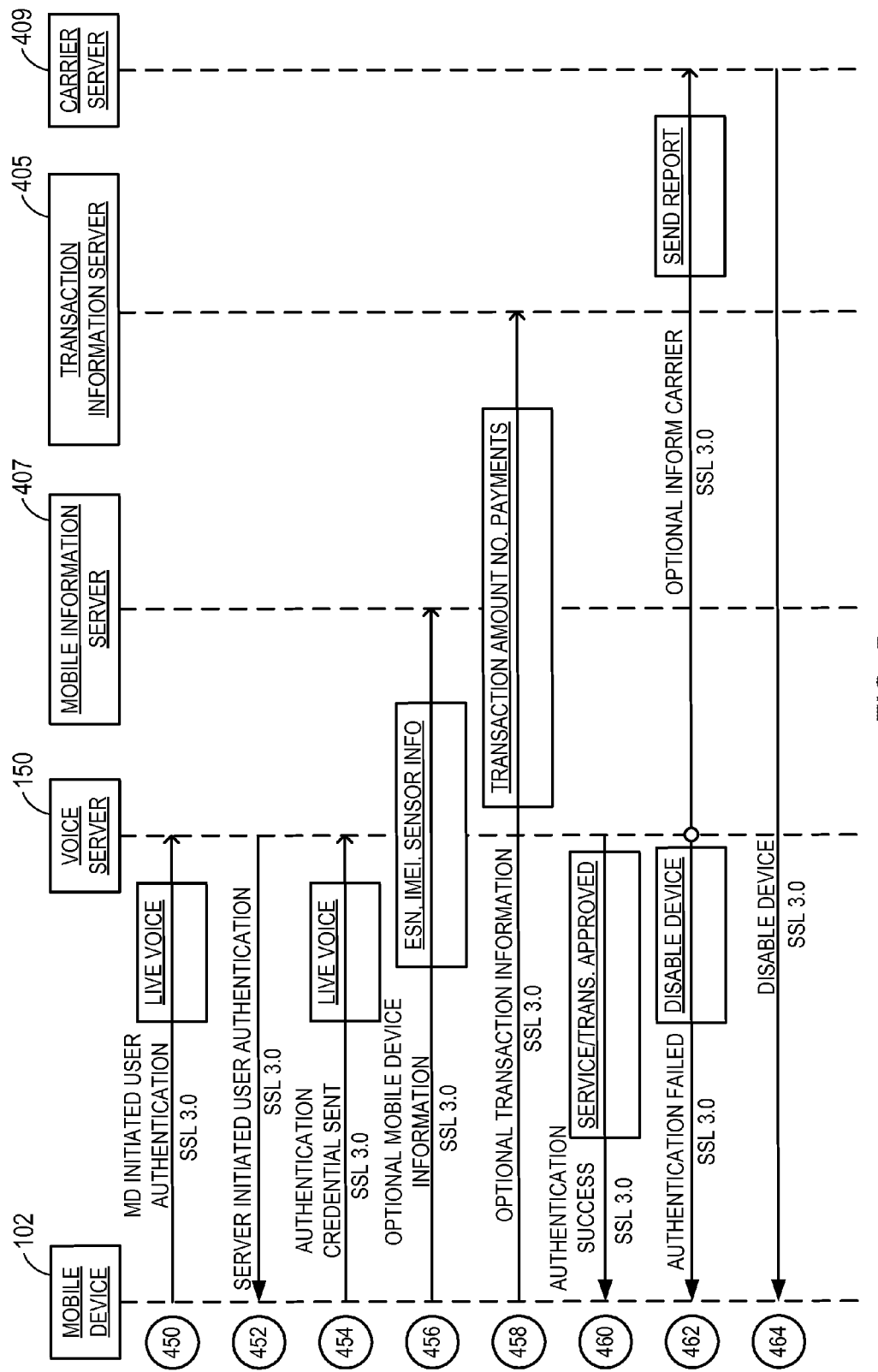
FIG. 5 is a flow diagram showing an example of an authentication process for the mobile device with a voice server.

Turning now to FIG. 5, an example of this process is illustrated. At line 450 a mobile device 102 may initiate a user authentication via live voice to voice server 150. At line 452, voice server 150 may initiate a user authentication process. At line 454, mobile device 102 may transmit an authentication credential with the live voice. Further, optional mobile device information (line 456) may also be transmitted from the mobile device 102 to the mobile information server 407 such as ESN, IMEI, and sensor information.

Further, at line 458, mobile device 102 may further transmit optional transaction information, such as a transaction amount for a number of payments to a transaction information server 405. An example of this may be a transaction amount to an on-line company.

At line 460, voice server 150 may transmit an authentication successful signal back to the mobile device 102. This may indicate that the user has been identified as a valid user and/or a transaction has been approved. Alternatively, at line 462, the voice server 150 may determine that the user is not valid and not authenticated and may transmit back an authentication fail signal back to the mobile device in order to disable the mobile device. Further, the voice server 150 may optionally inform the carrier via a report that the mobile device has been stolen and has been disabled. The carrier server 409 may also transmit a signal 464 back to the mobile device 102 to disable the device.

It should be appreciated that by using the previously-described continuous voice authentication process for the mobile device 102 that solutions to a multitude of user scenarios can be provided, such as: eliminating unauthorized usage; identifying mobile device theft; and preventing cloning of mobile devices. Further, because this can be done with existing hardware, this functionality can be deployed in developing countries that have greatly expanding mobile device/cell phone markets where expensive or additional authentication hardware is not feasible. Thus, embodiments of the invention may: utilize existing hardware and protocols for cell phones and servers; provide authentication of a user utilizing either the mobile device or a server; and utilize audio sampling at normal rates.

Thus, as previously described, embodiments of the invention protect against the theft of a mobile device 102 using a covert authentication processes involving voice authentication. Other covert identification characteristics such as position, direction, speed, past and new user data may also be utilized. Further, as well as covert operations, overt operations, such as face recognition or iris verification via a camera 144, fingerprint verification via a fingerprint sensor 142, or PIN entries via the user interface 122 may also be utilized.

As example techniques of the previously described system, the mobile device 102 also has the capability to get GPS location information and to support biometrics input. Thus, the mobile device has the capability to send the biometrics input together with the GPS location as part of the user authentication process to server 150. As previously described, either the mobile device 102 or the server 150 can initiate the user authentication process. As an example, the mobile device 102 may ask the user to enter required overt authentication such as biometrics (e.g., eye scans, face scans, fingerprints, etc.) through such devices as the fingerprint sensor 142, and camera 144, etc. (i.e., overt information). Alternatively, this type of information—eye scans, face scans, fingerprints, etc., may be obtained covertly using fingerprint sensor 142, camera 144, etc.

The mobile device 102 may also use other sensors (common and already present in mobile devices) to get other information such as direction, speed, etc., to the server 150. The mobile device 102 may also get device ID such as phone number, address etc. In one embodiment, the mobile device 102 may package these types of user biometric information, location information, direction/speed, device ID, etc. into a single message and send this single message via the secure channel to the server. The server may process this message and verify the information (e.g. user biometrics information, location, direction/speed, device ID, etc.) and use this information to determine if the user at the mobile device is authentic. This provides a more-well defined authentication process that utilizes both overt and covert information. In fact, the server may also include an operator (a human or voice recognition (VR) program) that may talk with the user to get voice input and use the voice input together with other information to verify the user in the mobile device.

Cloning

Further, embodiments of the invention may aid in preventing the cloning of mobile devices 102. Mobile device cloning includes copying the identity of one mobile device to another mobile device. Usually, this may be done for the purpose of making fraudulent telephone calls. The bill for the call goes to the legitimate subscriber. In the previously-described implementation, a carrier 409 may accept the user as authenticated and allow the mobile device 102 to work on the network. However, if a mobile device was cloned, due to the previously described authentication process, the cloned mobile device may not be able to work on the network because of a lack of valid voice-based authentication and/or based on other biometric information. Further, if there are multiple mobile devices, only the mobile device with the most recent biometric authentication would be allowed to work on the network and the other mobile devices attempting access would be deemed to be cloned and deactivated from the network. Additionally, if a mobile device was cloned and the legitimate user did not do this, the carrier could use the location and biometric information may be used to identify the user who had cloned the phone and where it was currently located.

Developing Markets

The use of mobile devices (in particular cell phones) is growing at tremendous rates in developing countries. Many of these mobile devices are very simple and low cost and are used to make phone calls and text messages. Countless millions are added to the likes of countries such as China and India each year. It would be very difficult to try to add new hardware requirements in these areas. Therefore, embodiments of the invention provide great benefit for use of in these massive developing markets. In essence, a standard microphone is already found on each mobile device and may be utilized with existing standards and is of great benefit.

Payments And Contracts

If there is stored value associated with the mobile device 102, or some linkage to a debit card, having random authentications to the mobile device 102, as previously described, would permit quick payment transactions for goods and services (and knowledge that the real user has authorized the transaction). A larger transaction value may require immediate verification—and multi-factor authentication could be employed.

Further, the mobile device 102 utilizing the previously-described voice authentication process may be useful in enforcing contracts between two or more parties. For example, the terms of the arrangement may be specified—voice/text snippets can be verified in the background to validate the users—and the contract and digital guarantees of the parties may be stored on the transaction database server 405. Covert, overt, immediate, or recent user authentication can be used in these scenarios—based upon what the transaction or parties deem required.

Also, in one embodiment, the carrier 409 or another entity could serve as a notary public and permit users to enroll family members, work colleagues, etc., on their mobile device 102 so they have profiles and may borrow and utilize the mobile device. For example, the mobile device 102 may be put into a "guest mode" after a covert and/or overt authentication of the authorized mobile device user has been ascertained and then, as an example, after a first single authorized call, the mobile device reverts back to "owner" mode. There may be various limitations associated with the "guest mode" such as guests would not be allowed to perform "transactions" with the mobile device.

Device Theft

The mobile device 102 may be also be utilized to aid in identifying mobile device theft. If the mobile device has been stolen, when the thief tries to use the mobile device—unknown to the thief—a live voice snippet can be compared to the stored voice template—when they do not match—the mobile device will be disabled (e.g., except for '911 calls) and information on the location of the handset may be sent to the carrier.

Covert Mobile Device Identification Techniques

As previously described, sensors (already present on the mobile device) and/or various phone identification parameters may be captured and added to the user authentication log. The sensors that may be employed include sensor for: GPS, direction, speed, etc. Whereas unique phone identification numbers may include: SIM card number, IMEI, and ESN. This type of information may be useful in some areas such as: multi-factor authentication; device theft; and anti-cloning techniques; as previously described.

Further, many of the previously-described techniques can capture user identification samples covertly with standard hardware components found virtually in all existing mobile devices and cell phones today. These include: voice verification; face recognition via the camera on the cell phone; and iris recognition also using the camera on the cell phone. These could be covert and utilized at random time samples and these types of data may be transmitted along with voice transmissions back and forth to the server. Moreover, these covert techniques can also be implemented at the mobile device itself such that local voice may be compared to the stored voice template of the mobile device in conjunction with the other covert voice/face/iris data to determine if the mobile device is in the possession of the rightful owner. Also, as previously described, this type of data may also be requested overtly.

Another type of covert operation that may be used for covert authentication may include monitoring the texting or handwriting on the mobile device 102 (e.g., playing a game at hands length, texting another user, handwriting a letter to another user, etc.) and taking randomly timed pictures of the user from the forward facing camera—and have the processor of the mobile device or server 150 perform face recognition to compare if the person using the mobile device is the authorized user or not. Additionally, another type of covert operation that may be used for covert authentication is while the mobile device is up against the user's ear for a call, the forward facing camera may snap a shot of the user's ear and compare that against the stored one for the user (i.e., an external ear structure can be used as a biometric), which can be performed by the processor locally or at the server.

Aspects of this invention may also allow for covert remote user authentication—if a person does not know the other party or wanted to make sure who the other party was—their identity may also be verified in the same process as described above. The person who does not know the other person may get some pop-up message that either confirms or denies the person on the other end of the phone conversation.

These samples are covert in that no explicit prompt is required for this information. However, these same authentication factors can be requested overtly and supplied by the user for the system's use in authentication alone and/or in comparison with the covertly acquired data. Moreover, these authentication methods can be layered (combined) for multi-factor authentication applications as well.

Overt Authentication

Additionally, aspects of the invention may also utilize overt authentication. For example, authentication hardware mechanisms may be employed to obtain overt authentication such as: password or PIN input; fingerprint scan; face scan; eye scan, etc. Because these are overt, the system would be required to tell the user to perform the authentication (i.e., enter a PIN or swipe a finger), so that the users are cognizant of the authentication. Also, this overt authentication may be layered (combined) for multi-factor authentication applications as well. It should be appreciated that embodiments of the invention include a wide variety of covert and/or overt technical features that may be used together or independently of one another and may be used alone and/or in conjunction with voice sampling authorization.

Example Technical Features

Examples of some technical features that may be utilized with embodiments of the invention will be hereinafter described. For example, as to a voice sample rate: a voice file may have a sampling rate of 8 kHz to 22 kHz and 16-bit resolution. As to audio sample duration: a suitable voiceprint may be between 2-8 seconds of speech. As to an audio master template: a user's "voice prints" may be contained in a single, encrypted IP packet less than 1K in size. An audio frequency range of 300-3400 Hz or better may be utilized. An audio signal-to-noise ratio of at least 10 db may be utilized. The audio samples may be processed on the mobile device and/or at the voice server and may be compared. The verification of the live voice sample and stored voice template can be done at the mobile device and/or at the voice server.

Further, existing cryptographic SSL 3.0 protocol may be used. SSL may encrypt the segments of network connections at the Transport Layer end-to-end. A certificate handoff may be used with embodiments of the invention in which case the protocol may use a third party, a Certificate Authority (CA), to identify one end or both ends of the transactions. A certificate may contain information about the owner of the certificate, like e-mail address, owner's name, certificate usage, duration of validity, resource location or Distinguished Name (DN) which includes the Common Name (CN) (web site address or e-mail address depending of the usage) and the certificate ID of the person who certifies (signs) this information. It may also contain the public key and finally a hash to ensure that the certificate has not been tampered with.

Additionally, embodiments of the invention may employ an easily defined data exchange format. It may use protocol buffers which are a flexible, efficient, and automated for serializing structured data. A designer may define how to structure the data once, then use special generated source code to easily write and read structured data to and from a variety of data streams. The design may even update the data structure without breaking deployed programs that are compiled against the "old" format. Each protocol buffer message may be a small logical record of information, containing a series of name-value pairs. The "authentication window"—the time between the last confirmed user authentication and when the next voice snippet—may be variable in length—potentially determined by the current authentication scenario. For example, if the phone is just being used for a voice call authentication then this would not need to occur frequently. However, if a "higher price tag" use case is being undergone by the user currently—the system may well require an immediate and new voice snippet to be sent for verification. Additionally, "higher price tag" use may utilize frequent and/or multiple layers of verification.

If the user has not been authenticated to the device for some set period of time—it may be that for whatever new service the user wants to perform the first voice utterance is sent off for verification. Thus, the mobile device may have entered a timeout or locked state and requires re-authentication. Further, the entire software solution for this invention may be extremely inexpensive and may rely on no new standards or hardware.

It should be appreciated that embodiments of the invention as previously described may be implemented in conjunction with the execution of instructions by processor 130 of mobile device 102 and/or processor 442 of voice server 150 and/or other circuitry of mobile device 102 and voice server 150 and/or other devices. Particularly, circuitry of mobile device 102 and voice server 150 including but not limited to processors 130 and 442, may operate under the control of a program, routine, or the execution of instructions to execute methods or processes in accordance with embodiments of the invention. For example, such a program may be implemented in firmware or software (e.g. stored in memory and/or other locations) and may be implemented by processors, such as processors 130 and 442, and/or other circuitry. Further, it should be appreciated that the terms processor, microprocessor, circuitry, controller, etc., refer to any type of logic or circuitry capable of executing logic, commands, instructions, software, firmware, functionality, etc. Further, mobile device 102, when utilized as a mobile or wireless device, may communicate via one or more wireless communication links 113 that are based on or otherwise support any wireless communication technology. For example, a previously described, in some aspects, mobile device 102 may be associated with a network including a base station 104, a core network 108, the Internet 110, and a Public Switched Telephone Network (PSTN) 112. Further it should be appreciated that voice calls include data from speakerphones in use and/or a "video telephony" (e.g., VoIP) phone calls.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device operable with a core network comprising:
   a user interface;
   a transceiver;
   a microphone; and
   a processor to:
      continuously sample a voice of a user from the microphone during a call by obtaining voice snippets on a pre-defined periodic basis or on a random basis;
      transmit the sampled voice via the transceiver to a voice server separate from a carrier server to authenticate the user based on the sampled voice; and
      receive an authentication successful signal or an authentication failed signal from the voice server, wherein upon receipt of the authentication failed signal, the processor of the mobile device locks the functionality of the mobile device, ends the call, and the voice server is commanded to transmit an invalid user signal to the carrier server to report the mobile device as stolen and to command the carrier server to transmit a disable signal to the mobile device that received the authentication failed signal to deactivate the mobile device from the core network, wherein if the authentication successful signal is received, the carrier server does not transmit a disable signal allowing for normal operation of the mobile device on the core network.

2. The mobile device of claim 1, wherein the stored voice to authenticate a valid user is based upon a user's voice recorded as part of an enrollment process during a purchase of the mobile device.

3. The mobile device of claim 1, wherein locking the functionality of the mobile device further comprises disabling the user interface and the transceiver and ending the call.

4. The mobile device of claim 1, further comprising a fingerprint sensor to obtain a user's fingerprint or a camera to obtain a picture of the user's face, wherein the user's fingerprint or picture are used in combination with the sampled voice to authenticate a valid user.

5. The mobile device of claim 1, wherein other covert information from the mobile device including location, direction, speed, or recent data entered into the user interface are used in combination with the sampled voice to authenticate a valid user.

6. A method to continuously authenticate a user of a mobile device operable on a core network comprising:
   continuously sampling a voice of a user from a microphone during a call by obtaining voice snippets on a pre-defined periodic basis or on a random basis;
   transmitting the sampled voice to a voice server separate from a carrier server to authenticate the user based on the sampled voice;
   receiving an authentication successful signal or an authentication failed signal from the voice server, wherein upon receipt of the authentication failed signal,
   locking the functionality of the mobile device;
   ending the call; and
   commanding the voice server to transmit an invalid user signal to the carrier server to report the mobile device as stolen and to command the carrier server to transmit a disable signal to the mobile device that received the authentication failed signal to deactivate the mobile device from the core network, wherein if the authentication successful signal is received, the carrier server does not transmit a disable signal allowing for normal operation of the mobile device on the core network.

7. The method of claim 6, wherein the stored voice to authenticate a valid user is based upon a user's voice recorded as part of an enrollment process during a purchase of the mobile device.

8. A mobile device operable with a core network comprising:
   means for continuously sampling a voice of a user from a microphone during a call by obtaining voice snippets on a pre-defined periodic basis or on a random basis;
   means for transmitting the sampled voice to a voice server separate from a carrier server to authenticate the user based on the sampled voice; and
   means for receiving an authentication successful signal or an authentication failed signal from the voice server, wherein upon receipt of the authentication failed signal, implementing means for locking the functionality of the mobile device, means for ending the call, and means for transmitting a command to the voice server to transmit an invalid user signal to the carrier server to report the mobile device as stolen and to command the carrier server to transmit a disable signal to the mobile device that received the authentication failed signal to deactivate the mobile device from the core network, wherein if the authentication successful signal is received, the carrier server does not transmit a disable signal allowing for normal operation of the mobile device on the core network.

9. The mobile device of claim 8, wherein the stored voice to authenticate a valid user is based upon a user's voice recorded as part of an enrollment process during a purchase of the mobile device.

10. A non-transitory computer program product to continuously authenticate a user of a mobile device operable with a core network comprising:
a non-transitory computer-readable medium comprising code for:
continuously sampling a voice of a user from a microphone during a call by obtaining voice snippets on a pre-defined periodic basis or on a random basis;
transmitting the sampled voice to a voice server separate from a carrier server to authenticate the user based on the sampled voice;
receiving an authentication successful signal or a authentication failed signal from the voice server, wherein upon receipt of the authentication failed signal, locking the functionality of the mobile device;
ending the call; and
commanding the voice server to transmit an invalid user signal to the carrier server to report the mobile device as stolen and to command the carrier server to transmit a disable signal to the mobile device that received the authentication failed signal to deactivate the mobile device from the core network, wherein if the authentication successful signal is received, the carrier server does not transmit a disable signal allowing for normal operation of the mobile device on the core network.

11. The non-transitory computer program product of claim 10, wherein the stored voice to authenticate a valid user is based upon a user's voice recorded as part of an enrollment process during a purchase of the mobile device.

12. A server separate from a carrier server operable with a core network comprising:
a transceiver to receive and transmit data; and
a processor to:
receive from the transceiver a sampled voice of a user transmitted from a mobile device during a user's call including receiving voice snippets on a pre-defined periodic basis or on a random basis from the mobile device; and
compare the sampled voice from the mobile device to a stored voice for the user to authenticate a valid user, wherein if the sampled voice matches the stored voice for a valid user, an authentication successful signal is transmitted back to the mobile device and functionality of the mobile device is allowed to continue and the carrier server is not commanded to transmit a disable signal to the mobile device allowing for normal operation of the mobile device on the core network, whereas if the sampled voice does not match the stored voice for a valid user, an authentication failed signal is transmitted back to the mobile device, wherein upon receipt of the authentication failed signal, the functionality of the mobile device is locked and the call is ended, and wherein, if the sampled voice does not match the stored voice for a valid user, the processor further commands an invalid user signal be transmitted via the transceiver to the carrier server to report the mobile device as stolen and to command the carrier server to transmit a disable signal to the mobile device that received the authentication failed signal to deactivate the mobile device from the core network.

13. The server of claim 12, wherein the stored voice to authenticate a valid user is based upon a user's voice recorded as part of an enrollment process during a purchase of the mobile device.

14. A server separate from a carrier server operable with a core network comprising:
means for receiving a sampled voice from a user transmitted from a mobile device during a user's call including receiving voice snippets on a pre-defined periodic basis or on a random basis from the mobile device; and
means for comparing the sampled voice from the mobile device to a stored voice for the user to authenticate a valid user, wherein if the sampled voice matches the stored voice for a valid user, an authentication successful signal is transmitted back to the mobile device and functionality of the mobile device is allowed to continue and the carrier server is not commanded to transmit a disable signal to the mobile device allowing for normal operation of the mobile device on the core network, whereas, if the sampled voice does not match the stored voice for a valid user, an authentication failed signal is transmitted back to the mobile device, wherein upon receipt of the authentication failed signal, the functionality of the mobile device is locked and the call is ended, and wherein, if the sampled voice does not match the stored voice for a valid user, the server further comprises means for commanding an invalid user signal be transmitted to the carrier server to report the mobile device as stolen and means for commanding the carrier server to transmit a disable signal to the mobile device that received the authentication failed signal to deactivate the mobile device from the core network.

15. The server of claim 14, wherein the stored voice to authenticate a valid user is based upon a user's voice recorded as part of an enrollment process during a purchase of the mobile device.

* * * * *